April 5, 1927.
L. C. HARROD
1,623,407
SELF ADJUSTING PACKING FOR PISTONS
Filed April 23, 1925
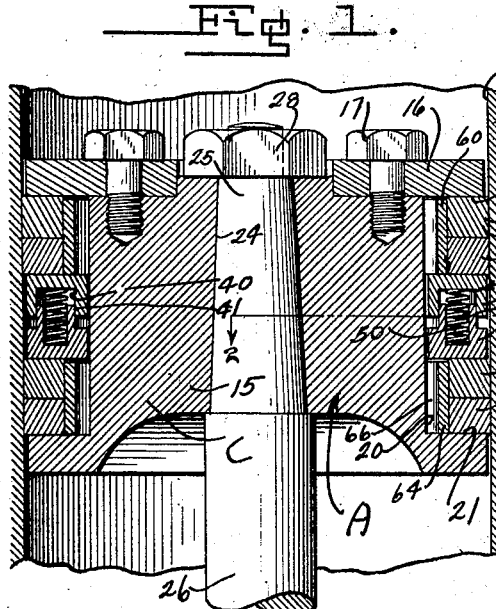
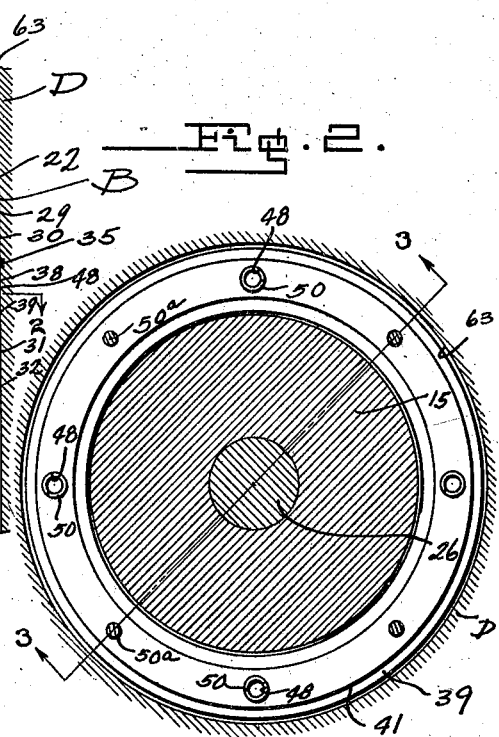
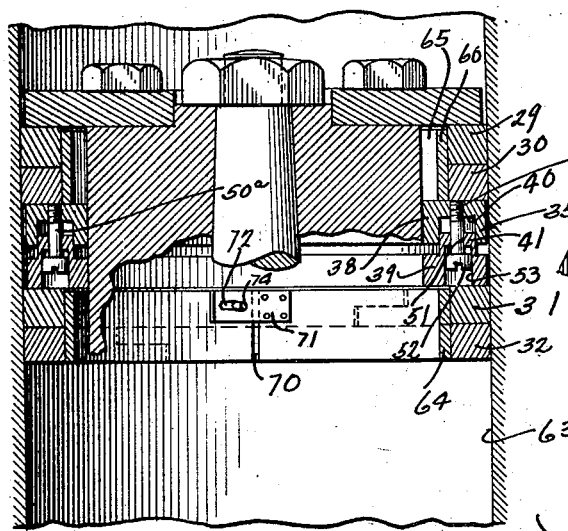
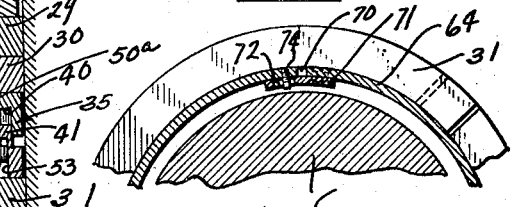
Inventor
Lewis C. Harrod
Attorneys Patented Apr. 5, 1927.

1,623,407

UNITED STATES PATENT OFFICE.

LEWIS C. HARROD, OF LONG ISLAND, NEW YORK.

SELF-ADJUSTING PACKING FOR PISTONS.

Application filed April 23, 1925. Serial No. 25,369.

This invention relates to improvements in piston packings.

The primary object of this invention is the provision of a self adjusting packing particularly well adapted for reciprocating pump pistons, being of such nature that yieldable expansion is exerted on the piston packing both axially of the piston and circumferentially thereof to insure proper fit of the piston in the cylinder bore in which the piston operates.

A further object of this invention is the provision of improved means for exerting expansible force on piston rings or packings.

A further object of this invention is the provision of improvements in piston ring packings embodying means for maintaining the piston packings in firm relation with the piston bodies upon which they are placed, including self adjusting spring means for maintaining the packings in tight relation with the piston body on which they are placed.

A further object of this invention is the provision of an improved piston packing embodying means for operating on the same to take up slack thereon incident to wear, so that the piston may operate within a cylinder in an efficient manner for a longer period of time than is customary with conventional pistons and packings therefor.

A further object of this invention is the provision of means which will permit of piston packing rings to accustom themselves in proper working relation to cylinders of various sizes.

Other objects and advantages of this invention will be apparent during the course of the following detailed description.

In the accompanying drawing, forming a part of this specification, and wherein similar reference characters designate corresponding parts throughout the several views, Figure 1 is a cross sectional view taken longitudinally through a piston, showing the improved packing arrangement therefor in the relation to the piston and cylinder in which the piston operates.

Figure 2 is a cross sectional view taken substantially on the line 2—2 of Figure 1.

Figure 3 is a fragmentary cross sectional view taken substantially on the line 3—3 of Figure 2.

Figure 4 is a fragmentary sectional view showing novel details of this invention.

In the drawing, wherein for the purpose of illustration is shown the preferred embodiment of this invention, the letter A may generally designate a piston which includes the improved packing arrangement B, adapted to cooperate in novel relation with the body arrangement C of the piston A and with a cylinder D in which the piston A operates.

The piston body may be, of course, of various shapes and sizes, and adapted for various purposes. In the preferred instance the body arrangement C includes the main portion 15, and a follower ring 16 bolted, as at 17, upwardly thereon and together with the main portion 15 providing a circumferential groove 20, having the facing annular surfaces 21 and 22 between which and in the annular groove 20 packing arrangement B is adapted to be seated in a novel relation to be subsequently described. The piston body C may have a tapered passageway 24 therethrough adapted to receive the tapered end 25 of the piston rod 26; the tapered end 25 being screw threaded and adapted to receive a nut 28 for the clamping of the piston body in a firm relation upon the piston rod 26.

In the preferred construction the packing arrangement B preferably includes a pair of upper packing rings 29 and 30, and a pair of lower packing rings 31 and 32. These packing rings 29 to 32 inclusive, are preferably of the same construction, and are of the expansible lap jointed type of conventional formation. These annular rings of course are disposed in the groove 20 of the piston body structure, and between the upper pair and lower pair of piston packings it is preferred to provide an expansion structure 35 which exerts a yieldable expanding force in opposite directions on the upper and lower pairs of packing rings, to maintain said packing rings in firm seating relation against the facing surfaces 21 and 22 of the piston body structure, to prevent longitudinal movement of the piston packings in the groove, incident to wear or other causes.

Referring to the expansion structure 35 which exerts an expansion force on the piston rings axially of the piston, the same includes a pair of closed ring sections 38 and 39, respectively, having a facing annular groove 40 and an upwardly extending reduced tongue 41 adapted to fit in sliding relation in the groove 40. The groove 40 is placed in the section 38 between the inner and outer peripheral circumferences thereof, and the outer and inner peripheral surfaces of the tongue 41 are likewise disposed inwardly of their adjacent inner and outer peripheral circumferences of the section 39. The tongue 41 has a snug sliding fit in the groove 40 so that the sections 38 and 39 may be relatively moved axial, although not laterally of each other. It is preferred to provide a plurality of pockets 48 inwardly of the section 39 of the structure 35, and more particularly opening upwardly through the top surface of the tongue 41. Expansion springs 50, preferably of the spiral type are yieldably seated in these pockets 48 and extend upwardly from the top surface of the tongue 41 for engagement against the bottom surface of the groove 40 in the section 38. These springs 50 maintain the sections 38 and 39 of the expansion structure 35 in such relation that they may be moved toward each other to compress the springs. The springs 50 are entirely sealed between the sections 38 and 39 when the structure 35 is assembled. In order to prevent detachment of the sections 38 and 39, it is preferred to provide a plurality of pins or screws 50ª, which slidably extend through suitable openings 51 in the section 39, and at their screw threaded ends are in engagement with the section 38. The heads 52 of the screws 50ª are slidably disposed in pockets 53 provided inwardly from the lower or outer face of the section 39, and it can readily be understood that the springs 50 can only urge the sections 38 and 39 away from each other until the head of the screws 50ª comes into engagement with the bottom of the pockets 53, and at this point the sections 38 and 39 are still maintained in an assembled relation with the tongue 41 in the pocket 40.

The expansion structure 35 placed in the location above mentioned will act to compress the rings 29 and 30 together to maintain them in tight seating relation between the structure 35 and the surface 22, and in similar manner the expanding structure 35 exerting its force axially of the piston acts on the pair of packing rings 31 and 32 to compress the same into tight seated relation against the surface 21 of the piston body.

For the pair of rings 29 and 30 a circumferential expanding element 60 is provided, tending to exert a radial expanding force on the packing rings 29 and 30, to seat them into firm sliding engagement against the wall surfaces 63 of the cylinder D within which the piston operates. In similar manner a like expanding ring 64 is provided for operation against the packing rings 31 and 32 to urge them into firm seating engagement against the cylinder wall 63. The packing rings are less in thickness than the depth of the groove 20 of the piston body within which they are placed, so that an annular pocket 65 occurs between the pair of rings 29 and 30 and the piston body portion 15, within which the expanding ring shaped member 60 is placed. In like manner the packing rings 30 and 31 are only sufficient in thickness to provide a pocket 66 between the same and the piston body 15 to receive the expanding ring 64 which acts against the piston packings 31 and 32.

The piston ring expanding members 60 and 64 are of analogous formation, and are of inherent resiliency normally tending to expand within their respective pockets 65 and 66 toward the packing rings against which they engage into yieldable sliding engagement with the cylinder wall. These members 60 and 64 are split, as at 70, and inwardly thereof at one end, each member 60 and 64 has a connecting piece 71 fixed therewith, extending outwardly of the outer edge of the end to which it is fixed, and providing at its outwardly extending portion a groove 72. This connecting piece 71 is fixed at the inner periphery of the members 60 and 64, and the longitudinal groove 72 provided therein slidably receives a stop pin 74, carried by the opposite end of the members 60 and 64 to that end to which the piece 70 is fixed. This pin 74 and piece 71 permit limited expansion of the members 60 or 64, as the case may be, and enables their ready assemblage of the members 60 and 64. It is to be noted that the members 60 and 64 are held in place at opposite sides of the structure 35, incident to the fact that the structure 35 extends practically to the bottom annular surface of the groove 20 and provides upper and lower surfaces projecing inwardly of the groove 20 beyond the inner peripheries of the packing rings.

From the foregoing description of this invention it is apparent that a self adjusting packing arrangement has been provided with pistons, by means of which the piston packings are maintained both for circumferential and axial self adjustment with respect to the piston body. The yieldable rings 60 and 64 have an inherent resilient expansive force of not more than two pounds per square inch on the packing ring surfaces, and in the position shown they will act to seal the lap joints of the piston packings. The difference in height between the members 60 and 64 and their respective pairs of piston packings will be .010, so that the expansion rings 60 and 64 are permitted free expansive movement in their respective pockets, and so that the structure 35 is enabled to act in its axial expansion against the packing rings. The limited amplitude of movement of the structure 35 and the expansion rings 60 and 64 not only assures an easy assemblage of the part, but permits only a limited wear on the packing rings, so that damage on the parts cannot be occasioned because of too far wear on the packing rings.

Various changes in the shape, size, arrangement of parts, and construction of the parts out of different materials, may be made to the invention herein shown and described, without departing from the spirit of the invention or the scope of the claims.

I claim:

1. An expanding device for maintaining piston packings properly on the piston body comprising a pair of annular rings, one having a tongue thereon and the other having a groove adapted to receive the tongue, spring means for forcing the rings away from each other, and means to limit the amplitude of movement of the rings away from each other.

2. In self adjusting packing for pistons the combination of a pair of annular expansible rings, one of the same being provided with a reduced groove inwardly of a surface thereof, the other being provided with a reduced tongue for sliding transversely in said groove, the said annular tongue being provided with pockets for receiving spiral springs to normally urge said pair of annular rings apart, and movement limiting members detachably carried by that ring in which the groove is provided having a limited slidable connection in the other ring in which the tongue is provided.

3. An expanding device for maintaining piston packings properly on the piston body comprising a pair of annular rings, one of the same being provided with a reduced groove upwardly of a surface thereof and the other having a reduced tongue extending upwardly of a surface thereof adapted to slide transversely in the groove of the first mentioned ring, said ring in which the tongue is provided having pockets downwardly through said tongue, spiral compression springs carried in said pockets adapted to project upwardly therefrom whereby to be disposed in the groove of the ring in which said groove is formed to hold said rings in spaced resilient relation, and means for limiting the outward amplitude of movement of said rings to maintain the springs in a secreted relation between said rings.

4. In an expanding device of the class described a pair of rings being provided with tongue and groove joints whereby to connect said rings for transverse sliding, means acting on said rings normally tending to resiliently force the same apart, and means carried by said rings for connecting them to limit the amplitude of movement of the same away from each other responsive to said spring means.

LEWIS C. HARROD.